United States Patent

[11] 3,588,908

| [72] | Inventor | James M. Lindsey<br>Houston, Tex. |
|---|---|---|
| [21] | Appl. No. | 776,191 |
| [22] | Filed | Nov. 15, 1968 |
| [45] | Patented | June 28, 1971 |
| [73] | Assignee | Sperry Sun Well Surveying Company<br>Sugar Land, Tex. |

[54] BOREHOLE INSTRUMENT
11 Claims, 3 Drawing Figs.
[52] U.S. Cl. .................................................. 346/33,
346/7, 346/107, 33/205.5, 175/45
[51] Int. Cl. ................................................ E21b 47/022,
G01d 9/42
[50] Field of Search .......................................... 346/107
(W), 33 (Well), 7; 33/205.5 (P); 95/11 (HC);
250/(Inquired), 83.6 (W); 175/45, 44; 166/255

[56] References Cited
UNITED STATES PATENTS
| 2,584,983 | 2/1952 | Butterworth | 346/7X |
| 2,756,511 | 7/1956 | Young | 33/205.5 |
| 3,004,613 | 10/1961 | Murphey | 175/45 |
| 3,316,651 | 5/1967 | Godbey | 33/205 |

Primary Examiner—Joseph W. Hartary
Attorneys—George L. Church, Donald R. Johnson, Wilmer E. McCorquodale, Jr. and John E. Holder ABSTRACT: The particular embodiment described herein as illustrative of one form of the invention utilizes a motion sensing device to control the operation of a timing circuit in a downhole well tool. The absence of motion which is indicative of the tool being at its operating position, permits an electronic counting circuit to initiate signals for operating the tool. The tool is prevented from being operated in a nearly horizontal or inverted position even in the absence of motion. The tool may be repetitively operated by alternately causing motion and the absence of motion of the tool. A photographic recording device makes a record of such repetitive operations.

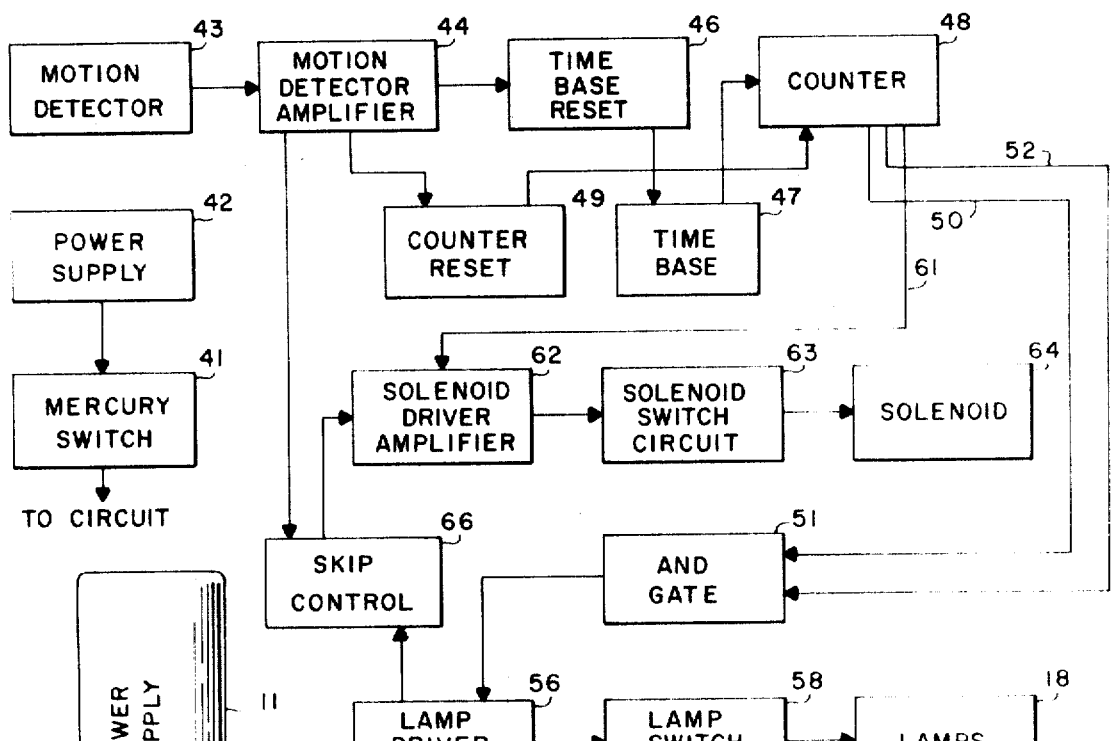
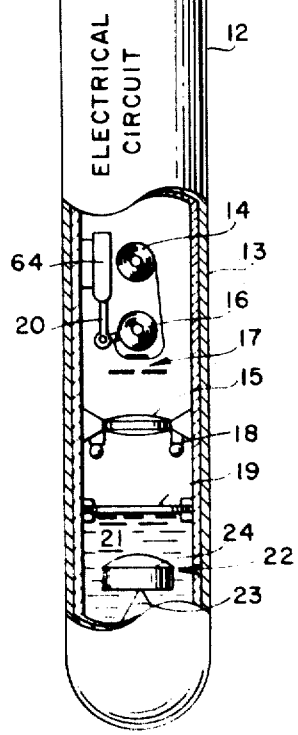
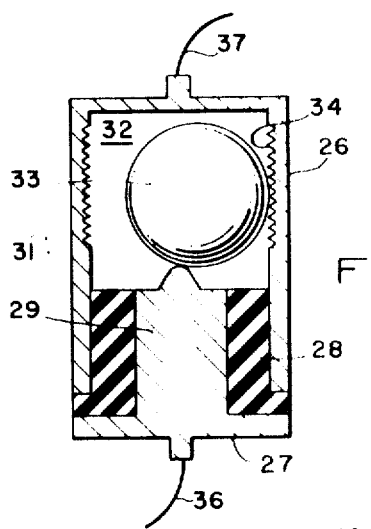
FIG. 1
FIG. 2
FIG. 3
INVENTOR
JAMES M. LINDSEY
*John E. Holder*
ATTORNEY

BOREHOLE INSTRUMENT

BACKGROUND OF THE INVENTION

The present invention pertains to a borehole tool and more particularly to a device for operating a borehole tool upon its reaching a downhole position by utilizing the presence and absence of motion of the tool.

When making drill holes in the ground, particularly drill holes which run partly through rock and partly through less consolidated earth layers, it often happens that the dip or inclination of the drill hole to the horizontal plane as well as the direction of the hole will vary quite considerably at different depths of the hole. In many cases, therefore, it is very important to determine the existing deviations from a desired inclination and direction and in addition it is often desirable to survey the complete traverse of an uncased hole. One such situation occurs when it is desirable to determine the true vertical depth of a hole in order, for example, to locate a geological formation relative to the well depth. A complete survey of the borehole traverse is also desirable for the purpose of a "check survey," used to determine if a directionally drilled hole is located at its intended position. However, the most common use for the so-called "multishot" directional survey is to determine the exact bottom hole location or the path of the wellbore. A survey of the path may be used to pick out an optimum point in the wellbore to start the deflection of a directionally drilled hole. Defining the bottom hole location would have applications to many situations as, for example, to determine where the hole bottom is located relative to a stratigraphic feature of a formation, or even for legal purposes.

One apparatus which has been used for the purposes outlined above is termed a multishot magnetic directional survey instrument. Such an instrument is used to obtain a running record of the inclination and the direction of inclination at various depths in a borehole. The instrument may be used for the purpose of orienting a hole in directional drilling operations, and also to chart the course of boreholes from surface to total depth during a normal drilling operation. The directional features of the instrument consist of a magnetic compass. The inclination unit is a form of inverted plumbob. These two features are combined into a single compass angle unit which may be available in various ranges of degrees of inclination. The compass angle unit is normally comprised of a floating magnetic needle designed so that its directional and angular positions may be simultaneously photographed and recorded on a film strip. A movie camera unit in the instrument makes a permanent record of the compass angle unit reading as it traverses the borehole. Electrical power to operate lamps in the camera unit may be furnished by batteries or by a conductor cable suspending the instrument from the earth's surface. An electrical circuit for activating the lamps is controlled by a clock which allows for a predetermined exposure period of the film frames for recording the inclination and direction of inclination indicated by he compass angle unit. The clock mechanism also provides for advancing the film and causing a delay of, for example, 20 seconds between frames of film wherein the lamps are shut off.

In operating such an apparatus, a desired compass angle unit is selected and assembled, and the batteries and films are loaded with the clock being set for the appropriate delay time between frames. The camera is then started, the instrument is assembled into a protective casing, and lowered on a wire line into an open hole or positioned in a nonmagnetic drill collar at the lower end of the drill stem. Alternatively, the apparatus may be go-deviled into a nonmagnetic drill collar and retrieved with an overshot or by pulling the drill string.

In any event, while the tool is being run into the well, the camera is operating to take picture records of the compass angle unit every 20 seconds. Since the instrument is in constant motion during this period, the film exposure will be blurred and unusable as a record of the instrument reading at that depth.

After the tool reaches a surveying station and becomes relatively still, the images recorded on the film will be intelligible. Therefore, the instrument will be left at such position for a period long enough to expose a desired number of frames with each frame exposure or reading being a check on other readings at the same location. After sufficient time has elapsed to make, for example, five exposures, the tool is moved to a second recording station whereupon the procedure is repeated. It is again pointed out that during the time the instrument is being moved to another station, the camera is continuing to take pictures of the compass angle unit. In order to correlate the exposures with the depths of the various stations, it is necessary to keep accurate records as to the time lapses, i.e., start and stop of the instrument motion and time on and between each station, from the moment the camera is started, when assembling the instrument until the last station is recorded and the tool is retrieved. In addition, the timing control or clock mechanism in the instrument must be accurate so that the time between and during exposures is accurately determinable in order to facilitate the time depth correlation. The time depth correlation requires considerable attention from the operator as well as time after the survey is run to make the correlation.

Since much of the exposed film has recorded "moving pictures," that is, images of the instrument while motion is occurring, a large amount of film is necessary in order to obtain a much less amount of usable records. The size of well tools, particularly those run inside drill pipe, is critical, and thus an adequate film supply can become a problem because of the limited space available for film magazines.

SUMMARY OF THE INVENTION

With this and other objects in view, the present invention contemplates an apparatus for programming the operation of a downhole operated well tool. The apparatus includes position and motion sensing devices, each of which can prevent the operation of a timing mechanism. When the tool is in a substantially upright position, power is supplied to the programming circuit. Thereafter, in the absence of motion, a motion detector means causes a timing mechanism to operate the tool on a repetitive basis. When the tool is moved, motion is sensed, and a function of the tool ceases to operate. When motion again ceases, the tool is reoperated. A signal is produced to make a record of the motion of the tool after each operation of the tool.

A complete understanding of this invention may be had by reference to the following detailed description, when read in conjunction with the accompanying drawings illustrating an embodiment thereof.

BRIEF DESCRIPTION OF THE DRAWINGS

FIG. 1 is a schematic view of an instrument for utilizing principles of the present invention;

FIG. 2 is a schematic diagram of an electrical circuit embodying principles of the present invention; and FIG. 3 shows a motion detecting device for use with the present invention.

DESCRIPTION OF THE PREFERRED EMBODIMENTS

Referring first to FIG. 1 of the drawings, a schematic view of a well surveying instrument includes at the upper end of the instrument a power supply section 11 which may be in the form of a battery pack or a power supply circuit receiving its power from a conductor cable (not shown) extending to the surface. Immediately below the power supply housing, is a control circuit housing 12 which contains the electrical circuitry for operating the surveying apparatus. The lower section 13 of the tool houses the survey instrument and includes a camera unit and surveying instrument. The camera unit has a film supply reel 14, ratchet driven takeup reel 16, and camera shutter system 17 positioned in the upper end of housing section 13. A solenoid 64 has a ratchet driver 20 connected to its armature for driving the film takeup reel and shutter. Each energization of the solenoid advances the film one frame. The solenoid 64 is operated by the circuit in housing 12. Below the film and shutter system is a lens 15 with lamps 18 being positioned below the lens. A glass disc 19, which contains a reticle in its center is positioned below the lamps in the housing. The glass disc also forms the upper end of a chamber 21 containing a fluid in which a compass angle unit 22 is pivotally floated. Indicia on the head 24 of the compass angle unit provides a visual indication of the direction and inclination of the tool housing. The buoyancy of the fluid in the chamber maintains the compass angle unit in a vertical position on its pivot 23 throughout various positionings of the instrument housing in the wellbore.

In the operation of the instrument described above, the electrical circuit is activated at some instant of time to energize the lamps 18. The light emanating therefrom is directed through the glass disc 19 onto the head 24 of the compass angle unit 22. The compass angle unit includes a magnetic needle which is oriented in a north-south direction. In addition, the unit is permitted to tilt on its pivot 23 away from the longitudinal axis of the tool, to provide an indication of the tool in the wellbore. Light impinging upon the head 24 of the unit is reflected back through the glass disc 19 and the reticle thereon, through the lens 15, and on to the film positioned in shutter system 17. Therefore, while the lamps are lighted, the film is exposed to the image presented by the compass angle unit head and the reticle engraved on the glass. The record of this image provides an indication of the direction and inclination of the borehole. After a predetermined exposure time, the control circuit shuts off the lamps 18 and also advances the film one frame, and the cycle is repeated.

The present invention pertains to a device for initiating and timing the operation of an instrument such as a directional surveying instrument, however it is pointed out that the timing or programming circuit disclosed herein would have application to other types of wellbore tools.

The apparatus of the present invention incorporates in an electrical circuit, a motion sensing device such as the one shown in FIG. 3 of the drawings. The apparatus of FIG. 3 includes a conductive housing 26. The housing is open at one end for receiving a plug 27 made of a conductive material. The plug is separated from the housing by an insulator 28 to provide a pair of electrically insulated conducting surfaces. The plug 27 has an upwardly extending portion 29 which is also insulated from the housing, and which has a pivot point 31 at its upper end. The space between the upper end of the upwardly extending portion 29 and the top of the housing 26 forms a chamber 32 which is sized to receive a ball 33. The ball is constructed of chrome or other such electrically conducting material. The inside wall surfaces 34 of the housing 26 which surround the chamber 32 are preferably roughened or threaded to provide a multiplicity of contacting points thereon which renders the device more sensitive to motion thereof. The ball is received within the chamber 32 and, in a motionless condition, the ball will rest on the pivot point 31 and against the inside roughened surfaces of the wall 34 of the housing. In this condition, the ball 33 establishes a conducting path between the plug 27 and the housing 26 which are furnished with respective contacts and conducting wires 36, 37. The roughened threaded walls of the housing form a more elastic surface to increase motion of the ball and thus sensitivity of the motion detector. As the ball rests upon the pivot 31 in the chamber 32, a slight movement of the instrument causes the ball to move on the pivot from one wall portion to the other, thus intermittently making and breaking a conducting path in an electrical circuit including wires 36 and 37.

Referring now to FIG. 2 of the drawings, the circuit for operating the apparatus includes a mercury switch 41 which is positioned electrically between the battery power supply 42 and the remaining portions of the circuit. The mercury switch is arranged so that when the apparatus is in an inverted or near horizontal position, no power is supplied from the batteries to the circuit. This permits make up and assembly of the tool prior to delivery of the tool to the well location. Upon movement of the tool from a horizontal position to a more vertical upright position, the switch is operated to supply power from the battery or other source 42 to the circuit of FIG. 2.

The circuit of FIG. 2 includes a motion sensing or detecting device 43 such as the one described with respect to FIG. 3. The motion sensing device is arranged in the circuit to control the output of a motion detecting amplifier 44. In the absence of motion the detector 43 closes a circuit path to cause the amplifier to produce an output for supplying a control signal to various other components in the system. The signal from the amplifier 44 is fed to a time base reset circuit 46 which in turn resets a time base or a low frequency oscillator circuit 47 to zero time each time motion is detected, and causes the oscillator to produce continuous output signals. The output of the oscillator is fed to a counter 48, which is in the form of an AC flip-flop in ripple count configuration.

A counter reset circuit 49 also receives an output signal from the motion detector amplifier 44. Thus when there is motion in the system, a transistor circuit in the counter reset 49 is shorted which in turn causes the ripple counter 48 to be placed in its original or start count condition.

The counter 48 is arranged so that after 20 pulses from oscillator 47 have been received by the counter, the counter will produce a signal through a first output line 50 to "and" gate 51. Another output line 52 is at the same potential to cause the gate to operate upon receiving the initial signal through line 50. Gate 51 is operated to provide power to a driver amplifier 56. The output of amplifier 56 operates a lamp switching circuit 58 or power switch to energize lamps 18 in the instrument. The energization of lamps 18 causes exposure of the film for the time period during which positive signals are provided from both outputs 50 and 52 of the counter to the "and" gate 51. Upon the lapse of a predetermined amount of time, for example 2½ seconds, a second signal is produced by the counter through output line 52 to the "and" gate 51. This second signal from counter 48 through line 52 is of an opposite potential from line 50, thus the gate closes and the lamps 18 are turned off. The operation of the circuitry just described permits exposure of the film for the 2.5 seconds.

As the counter continues to operate, after another predetermined period of time, an output 61 from the counter 48 produces a pulse which is sent to a solenoid driver amplifier 62 which in turn activates a solenoid switching circuit 63 to operate the solenoid 64. Operation of solenoid 64 advances the film in the camera one frame. After the solenoid has fired, the counter automatically resets to zero to begin counting again as long as pulses are being received from the time base. The output 61 from counter 48 may be arranged to produce an output signal to the solenoid driver at the beginning of the counter operation rather than at the end of the count operation, with the effect being the same. In any event, after the solenoid is operated, the counter will continue to operate or recycle, whichever the case may be. After a lapse of another predetermined period of time, for example 20 seconds, a signal is produced again through output 50 of the counter to initiate operation of the lamps. After 2.5 seconds the opposite polarity output of line 52 causes the "and" gate to be interrupted and thus deenergizes the lamps 18. This sequence of operation is continued until the apparatus is placed in a horizontal position, or inverted, wherein the mercury switch 41 deactivates the circuit, or motion is detected by the motion detector 43. Upon such motion being detected, the time base 47 of the counter will reset to zero as described above, and in addition, a counter reset will cause the counter to return to its initial position.

In addition to the circuit operation described above, the motion detector amplifier 44, upon receiving an indication of motion, provides a signal to a DC flip-flop, which is termed skip control 66. During the normal operation of the apparatus, when the output 52 of the counter 48 causes the "and" gate 51 to deactivate the lamp, this so-called lamp off signal is sent by means of amplifier circuit 56 to the DC flip-flop or skip control 66 to reset the output of skip control 66 to zero. The flip-flop 66 will remain in this condition until a signal is sent from the motion detector amplifier to the flip-flop 66. Thus, the skip control flip-flop will be ineffective to operate the solenoid until a signal from the motion detector amplifier changes the output thereof. In the meantime, the solenoid amplifier will be operated only by a signal from the output 61 of the counter. Therefore, each time after the lamp is energized and then deenergized, and the detector 43 detects motion, the solenoid 64 is actuated for advancing the film one frame. Since after normal operation of the counter and exposure of the frame the solenoid has already operated, this causes the skipping of one unexposed frame in the film strip to provide an indication on the film strip that motion has taken place. As will be hereinafter described, this provides a signal to the person interpreting the film as to movement between the stations in the surveying of a wellbore.

In the operation of the apparatus just described, the instrument is loaded with film, the tool is assembled, whereupon it may be placed in an inverted or horizontal position for transportation to the well site. The mercury switch 41 prevents the application of power from power supply 42 to the control circuit. When it is time to run the instrument into the well, the tool is raised to a substantially vertical upright position, whereupon the switch 41 is closed and power is supplied to the control circuit. However, during the period that the tool is being lowered into the wellbore, whether by wire line or go-deviling, the tool is in constant motion. The motion detector is therefore effective to maintain the control circuit in an unoperated condition. Upon reaching survey depth, the tool becomes "quiet," and the motion detector completes a circuit to the amplifier 44. Amplifier 44 supplies a signal to time base reset 46 which sets the oscillator at zero time and begins the operation of the oscillator 47. As the oscillator sends pulses to the counter 48, the counter begins to step or count. After counting for 20 seconds, a signal is generated on output line 50 which matches the output of line 52, whereupon "and" gate 51 is operated. Operation of gate 51 through the lamp circuit activates lamps 18. After a lapse of 2.5 seconds, line 50 or 52 changes polarity and closes the gate 51. Upon this happening, a reset signal is sent from the driver amplifier 56 to skip control 66 which changes the condition of flip-flop 66 to zero output. After another predetermined count, a signal through line 61 drives the amplifier 62 to actuate solenoid 64. This advances the film one frame to condition the system for a repetitive cycle of operation.

The above sequence of operation is continuously repeated until the tool is moved to another station. Upon movement thereof, the motion detector interrupts its output to the amplifier 44, which in turn interrupts its output to the skip control flip-flop 66. This changes the condition of flip-flop 66 and causes a signal to be sent to solenoid amplifier 62. This in turn causes the solenoid to actuate and advance the film one frame. Since the lamps are now off, the resulting unexposed frame provides an indication that the tool has been moved between stations.

At the same time the interruption of the signal to the motion detector amplifier causes the reset circuits 46 and 49 to short thus resetting the oscillator 47 and counter 48 to a zero time reference.

It is apparent that the film record of a survey taken with the above described device will be adequately referenced as to its stops between surveying stations and that therefore accurate time depth correlation records need not be made. Instead, the operator must merely record the depth of each surveying station. In addition, since it is no longer necessary to record time lapses between the surface and the first station and between subsequent surveying stations, an accurate record of such time lapses is not critical and therefore the design of the timing equipment may be more simple and less costly as a result.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

I claim:

1. In an apparatus for programming the operation of a downhole well tool, motion detector means for providing a signal indicative of the presence of motion; counting means for providing signals indicative of predetermined time lapse intervals; well tool means operative in response to at least one of said counting means signals; means for starting said counting means in the absence of a signal from said motion detector to operate said well tool means; means for stopping said counting means upon the occurrence of a signal from said motion detector means to stop the operation of said well tool means; and means for restarting said counting means in the absence of a signal from said motion detector to restart said well tool means.

2. The apparatus of claim 1 and further including means for preventing the operation of said well tool means when the attitude of said well tool means is other than that normally occurring during its operation in a wellbore.

3. The apparatus of claim 1 and further including means for providing an indication, readable at the surface, of the occurrence of a signal from said motion detector after said well tool means is operated.

4. In a wellbore tool, apparatus for programming the operation of the tool upon positioning of the tool at its operating position in the wellbore, which apparatus comprises: means for sensing the presence of motion of the well tool; means responsive to the absence of motion for initiating operation of the well tool in the wellbore; and means responsive to the presence of such motion for stopping the operation of the well tool, said initiating means being effective to restart the operation of said well tool in the absence of motion and continuously operate said well tool in the absence of such motion for an indefinite period of time.

5. The apparatus of claim 4 and further including means for providing a record of the stopping of the operation of the well tool.

6. In an apparatus for initiating the operation of a well tool function: counting means for initiating signals to start and stop an operation of the well tool after a predetermined time lapse from a zero time reference; motion sensing means for preventing operation of the well tool while said tool is in motion; time base means responsive to the absence of motion for initiating operation of said counting means; means responsive to the presence of motion for resetting said counting means to a zero time reference; and means responsive to a signal from said counting means for recording an event indicative of the operation of the well tool.

7. The apparatus of claim 6 wherein said counting means is comprised of an AC flip-flop circuit in the configuration of a ripple counter.

8. The apparatus of claim 7 wherein said means for initiating operation of said counting means includes a low frequency oscillator circuit which feeds pulses to said ripple counter.

9. In a wellbore surveying instrument having a lens, lamp, and film advance system for photographing an instrument indicative of wellbore conditions, means for initiating and stopping the application of electrical power to the lamps and for advancing film in the system, which means comprises: motion detecting means for providing a signal in the absence of motion of the instrument; means responsive to a signal from said motion detecting means for providing timed output pulses; counting means operated by said timed output pulses and producing first, second, and third spaced output signals at timed intervals from zero reference time; gate circuit means operative in response to said first and second output signals for initiating and stopping the application of power to the lamps; and means responsive to said third output signal for operating the film advancing means.

10. The apparatus of claim 9 and further including second film advance circuit means including means responsive to a signal from said motion detecting means after the application of power to said lamps has stopped for operating said film advancing means.

11. In a wellbore tool apparatus for programming the operation of the tool at its operating position in the wellbore: means for sensing the presence of motion of the tool; electronic timer means; means responsive to the absence of such motion for initiating the operation of said electronic timer means; means responsive to the operation of said timer means for a predetermined period of time for initiating the operation of the well tool in the wellbore; and means responsive to the presence of such motion for stopping the operation of the well tool, said means for initiating the operation of said well tool being effective to restart the operation of said well tool in the absence of such motion.